US007908061B2

(12) United States Patent
Sakai et al.

(10) Patent No.: US 7,908,061 B2
(45) Date of Patent: Mar. 15, 2011

(54) OPENING/CLOSING MEMBER CONTROL APPARATUS AND METHOD

(75) Inventors: Shin Sakai, Kosai (JP); Kazuyuki Hirai, Kasugai (JP); Toshihiro Saito, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 1231 days.

(21) Appl. No.: 11/513,356

(22) Filed: Aug. 31, 2006

(65) Prior Publication Data

US 2009/0299580 A1 Dec. 3, 2009

(30) Foreign Application Priority Data

Sep. 1, 2005 (JP) ................................ 2005-253102

(51) Int. Cl.
*G05D 3/00* (2006.01)
(52) U.S. Cl. ................................ 701/49; 701/1; 701/36
(58) Field of Classification Search ..................... 701/49
See application file for complete search history.

(56) References Cited

U.S. PATENT DOCUMENTS 5,459,379 A * 10/1995 Takeda et al. ................ 318/469
5,689,160 A * 11/1997 Shigematsu et al. .......... 318/281
6,477,454 B1 * 11/2002 Rogovin ......................... 701/36
2002/0143452 A1 * 10/2002 Losey ............................ 701/49
2002/0152013 A1 * 10/2002 Knab et al. ...................... 701/49
2004/0257010 A1 * 12/2004 Yamamoto ...................... 318/55
2005/0017667 A1 * 1/2005 Yamamoto .................... 318/469
2005/0187689 A1 * 8/2005 Westerhoff ..................... 701/49
2005/0203690 A1 * 9/2005 Russ et al. ...................... 701/49
2005/0212473 A1 * 9/2005 Yamamoto .................... 318/466
2005/0251314 A1 * 11/2005 Schindler et al. ............... 701/49
2007/0027587 A1 * 2/2007 Pedemas et al. .................. 701/2
2007/0276567 A1 * 11/2007 Schlesiger et al. .............. 701/49

FOREIGN PATENT DOCUMENTS

DE 10 2004 011 015.8 * 3/2004
JP B2-06-063403 8/1994
JP Y2-2577092 5/1998

* cited by examiner

*Primary Examiner* — Khoi Tran
*Assistant Examiner* — Jonathan L Sample
(74) *Attorney, Agent, or Firm* — Posz Law Group, PLC

(57) ABSTRACT

A control apparatus for a power window device stores a speed control start position that is set between a fully open position and a fully closed position, and a speed control end position that is set adjacently to the fully open position. While driving a windowpane in a direction toward the fully open position, the control apparatus reduces a motor output after the windowpane reaches the speed control start position until it reaches the speed control end position. The control apparatus de-energizes a motor when the windowpane reaches the speed control end position. The speed control end position is set at a position, from which the windowpane cannot reach the fully open position with its movement speed at the time the motor is de-energized.

8 Claims, 7 Drawing Sheets

OPENING/CLOSING MEMBER CONTROL APPARATUS AND METHOD

CROSS REFERENCE TO RELATED APPLICATION

This application is based on and incorporates herein by reference Japanese Patent Application No. 2005-253102 filed on Sep. 1, 2005.

FIELD OF THE INVENTION

The present invention relates to an opening/closing member control apparatus and its controlling method, and, particularly to the opening/closing member control apparatus that controls a speed of an opening/closing member according to an opening/closing position thereof, and to its controlling method.

BACKGROUND OF THE INVENTION

Conventionally, a device for raising/lowering a windowpane of a vehicle is constructed, such that the windowpane is raised or lowered through an elevating mechanism by transmitting rotary driving force by an electric motor to the elevating mechanism. In such a raising/lowering device, a driving voltage is simply applied to the electric motor according to rising or descending of the windowpane. Thus, when the windowpane is lowered to a bottom lock position, the windowpane is mechanically constrained by a stopper, thereby applying excessive impact force to a drive system. Accordingly, there is a problem of an occurrence of an offensive impulsive sound, as well as deterioration in durability of the drive system.

In order to avoid making an impact, which results in serious deterioration in the durability of the drive system, it is proposed to stop rotation of the electric motor by stopping a drive of the electric motor immediately before the bottom lock position and by lowering the windowpane to the bottom lock position through inertia (e.g., JP2577092 Y2 (pp. 3-6, FIGS. 11, 12)). However, since such an art still employs a configuration to stop the windowpane at the bottom lock position, an operation stop noise is inevitably made when the windowpane stops. In addition, when an operation of the motor is stopped before the bottom lock position, a stop position of the windowpane varies, thereby stopping the windowpane above a belt molding, under an influence of a variation in a load because of deterioration due to age and the like.

SUMMARY OF THE INVENTION

The present invention aims for provision of an opening/closing member control apparatus that can stop an opening/closing member before a fully open position without making an impulsive sound while driving the opening/closing member in a direction toward the fully open position, and that can reduce a variation in its stop position, and for the provision of its controlling method.

According to one aspect of the present invention, the opening/closing member control apparatus includes the opening/closing member, a drive mechanism, a position detector, and a control device. The opening/closing member can move between the fully open position and a fully closed position. The drive mechanism drives the opening/closing member to be opened or closed via the drive mechanism by operating a motor. The position detector detects a position of the opening/closing member. The control device controls drive of the motor based on a detected position of the opening/closing member. The control device stores a first set position that is set between the fully open and closed positions, and a second set position that is set between the fully open position and the first set position, as well as adjacently to the fully open position. While driving the opening/closing member in the direction toward the fully open position, the control device reduces a motor output after the opening/closing member reaches the first set position until it reaches the second set position. The control device de-energizes the motor when the opening/closing member reaches the second set position. The second set position is set at a position, from which the opening/closing member cannot reach the fully open position with its movement speed at the time the motor is de-energized.

DETAILED DESCRIPTION OF THE EMBODIMENT

Figure 1:
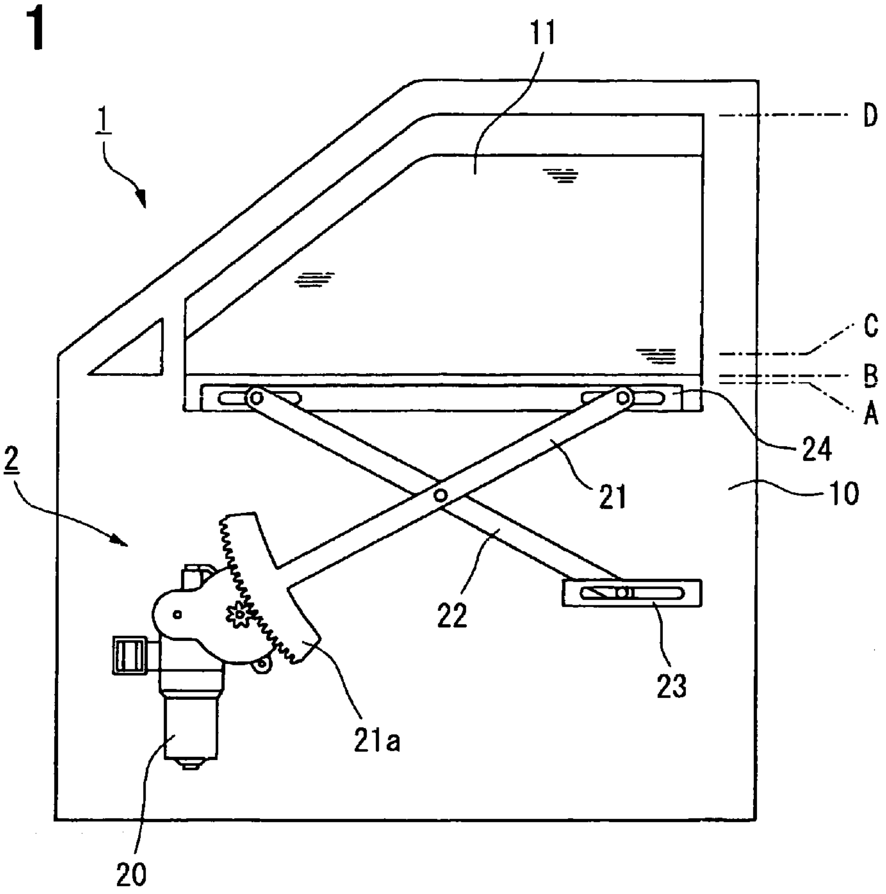
FIG. 1 is a schematic diagram of a power window device according to an embodiment of the present invention.
Figure 2:
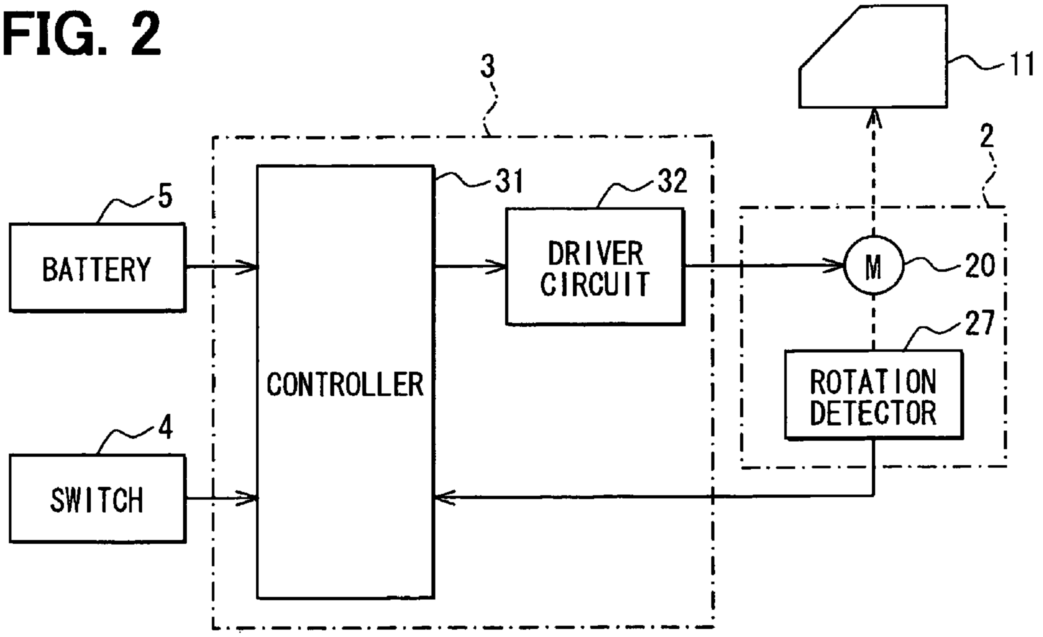
FIG. 2 is a block diagram of the power window device in FIG. 1.

With reference to FIG. 1, a power window device 1 is provided to move up and down (closes and opens) a windowpane 11 as an opening/closing member arranged in a door 10 of a vehicle by a rotary drive of a motor 20. A drive mechanism 2 that opens and closes the windowpane 11, a control device 3 to control an operation of the drive mechanism 2, and an operating switch 4 for an occupant to command the operation are main components of the device 1.

The windowpane 11 moves up and down along a rail (not shown) between an upper fully closed position (top) D and a lower fully open position (bottom) A.

The motor 20 having a speed reducing mechanism secured to the door 10, an elevating arm 21 with a fan-shaped gear 21*a* driven by the motor 20, a driven arm 22 that is pivoted to cross the elevating arm 21, a fixed channel 23 fixed to the door 10, and a glass-side channel 24 integrated with the windowpane 11 are main components of the drive mechanism 2.

The motor 20 is configured such that a rotor rotates forward and reverse as a result of a magnetic attraction effect generated between the rotor and a stator having a magnet by energizing a winding of the rotor after receiving an electric power supply from the control device 3. In the drive mechanism 2, when the elevating and driven arms 21, 22 swing correspondingly to rotation of the motor 20, sliding of their ends is restricted by the channels 24, 23, respectively, and the elevating and driven arms 21, 22 are driven as an X-link, thereby moving up and down the windowpane 11.

The motor 20 is integrated with a rotation detector 27. The rotation detector 27 outputs a pulse signal (rotation speed signal), which is synchronized with the rotation of the motor 20, to the control device 3. The rotation detector 27 is configured to detect a magnetic variation of the magnet that rotates with an output shaft of the motor 20 by means of a plurality of Hall elements. That is, the pulse signal is outputted according to each predetermined movement of the windowpane 11 or each predetermined rotation angle of the motor 20. Accordingly, the rotation detector 27 can output a signal that corresponds to a movement of the windowpane 11, which is approximately proportional to a rotation speed of the motor 20. Then, the control device 3 detects a position of the windowpane 11 by the pulse signal from the rotation detector 27. The position is detected by the rotation detector 27 and the control device 3.

In addition, while the Hall elements are employed for the rotation detector 27, an encoder may be employed as long as it can detect the rotation of the motor 20. Also, although the motor 20 is integrated with the rotation detector 27 to detect a rotation of the output shaft of the motor 20, the position of the windowpane 11 may be directly detected by other known detectors.

The control device 3 includes a controller 31 and a driver circuit 32. The controller 31 and the driver circuit 32 are fed with electric power, which is necessary for their operations, by a battery 5 mounted in the vehicle. The controller 31 includes a microcomputer that has a CPU, memories such as a ROM and a RAM, an input circuit, an output circuit, and the like. The CPU is connected to the memories, the input circuit, and the output circuit via a bus. Additionally, without being limited to this, the controller 31 may include a DSP or a gate array.

The controller 31 normally rotates the motor 20 forward and reverse through the driver circuit 32 based on an operating signal from the operating switch 4, thereby opening and closing the windowpane 11. Also, the controller 31 detects the position of the windowpane 11 based on the pulse signal received from the rotation detector 27, and regulates a magnitude of driving power, which is supplied to the motor 20 through the driver circuit 32 according to a detected position of the windowpane 11. More specifically, a magnitude of a drive voltage, or that of a duty ratio if the driving power is PWM-controlled, is regulated. By this means, a motor output is regulated.

The driver circuit 32 includes an IC that has an FET, and reverses polarity of the electric power supply to the motor 20 based on an input signal from the controller 31. That is, the driver circuit 32 feeds the electric power to the motor 20 in order to rotate the motor 20 in a forward rotating direction when the driver circuit 32 receives a forward rotation command signal from the controller 31. It feeds the electric power to the motor 20 in order to rotate the motor 20 in a reverse rotating direction when the driver circuit 32 receives a reverse rotation command signal from the controller 31. In addition, the driver circuit 32 may be configured to reverse the polarity using a relay circuit. As well, the driver circuit 32 may be configured to be incorporated into the controller 31.

The controller 31 detects a rising or descending part (a pulse edge) of the pulse signal that is inputted, and detects a rotating direction of the motor 20 based on a phase difference between each pulse signal. It also calculates the rotation speed (rotational period) of the motor 20 based on an interval (period) between the pulse edges. In other words, the controller 31 indirectly calculates the movement speed of the windowpane 11 based on the rotation speed (rotational period) of the motor 20, and identifies a moving direction of the windowpane 11 based on the rotating direction of the motor 20. Besides, the controller 31 counts the pulse edges. This pulse count value is added or subtracted according to an opening or closing movement of the windowpane 11. The controller 31 identifies an opening or closing position of the windowpane 11 by a magnitude of the pulse count value.

That is, the fully open position A is designated as a reference position, and the pulse count value is set at 0 (zero) at the fully open position A. One increment (+1) is added to the pulse count value every time the pulse signal is received while the windowpane 11 is moving up toward the fully closed position D, whereas one decrement (−1) is subtracted from the pulse count value every time the pulse signal is received while the windowpane 11 is moving down toward the fully open position A.

The operating switch 4 includes a swing type switch or the like, which allows a two-step operation, and has an opening switch, a closing switch and an automatic switch. By the occupant operating this operating switch 4, a command signal to open or close the windowpane 11 is outputted to the controller 31.

More specifically, when the operating switch 4 is operated toward its one end side by one step, the opening switch is turned on, and the operating switch 4 outputs to the controller 31 a normal opening command signal to perform a normal opening operation (i.e., an opening operation only while operated) on the windowpane 11. Also, when the operating switch 4 is operated toward the other end side by one step, the closing switch is turned on, and the operating switch 4 outputs to the controller 31 a normal closing command signal to perform a normal closing operation (i.e., a closing operation only while operated) on the windowpane 11.

In addition, when the operating switch 4 is operated toward its one end side by two steps, both the opening switch and the automatic switch are turned on, and the operating switch 4 outputs to the controller 31 an automatic opening command signal to perform an automatic opening operation (i.e., the opening operation to the fully open position even after the operation is stopped) on the windowpane 11. Also, when the operating switch 4 is operated toward the other end side by two steps, both the closing switch and the automatic switch are turned on, and the operating switch 4 outputs to the controller 31 an automatic closing command signal to perform an automatic closing operation (i.e., the closing operation to the fully closed position even after the operation is stopped) on the windowpane 11.

The controller 31 performs the normal opening operation on the windowpane 11 by driving the motor 20 through the driver circuit 32 all the while that the controller 31 is receiving the normal opening command signal from the operating switch 4 (all the while that the operating switch 4 is being operated). On the other hand, the controller 31 performs the normal closing operation on the windowpane 11 by driving the motor 20 through the driver circuit 32 all the while that the controller 31 is receiving the normal closing command signal from the operating switch 4 (all the while that the operating switch 4 is being operated).

Furthermore, when the controller 31 receives the automatic opening command signal from the operating switch 4, the controller 31 performs the automatic opening operation on the windowpane 11 to the fully open position by driving the motor 20 through the driver circuit 32. On the other hand, when the controller 31 receives the automatic closing command signal from the operating switch 4, the controller 31 performs the automatic closing operation on the windowpane 11 to the fully closed position by driving the motor 20 through the driver circuit 32.

Figure 3:
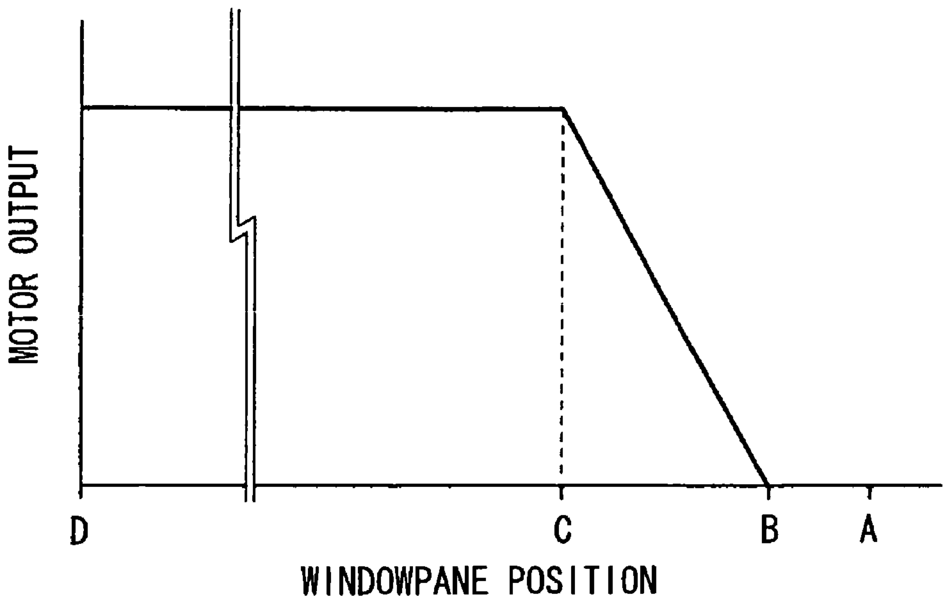
FIG. 3 is a diagram showing a relationship between a windowpane position and a motor output.

In the above configuration, the controller 31 stores the pulse count values at the fully open position (bottom lock position) A and at the fully closed position (top) D in the memory, and as described above, identifies the position of the windowpane 11 by the pulse count values to be added or subtracted according to rising or descending of the windowpane 11. Besides, between the fully open position A and the fully closed position D, a speed control start position C as a first set position is set at a predetermined position adjacent to the fully open position A as shown in FIGS. 1, 3. Then, between the speed control start position C and the fully open position A, a speed control end position B is set adjacently to the fully open position A.

When the controller 31 receives the continuous normal or automatic opening command signal from the operating switch 4, the controller 31 continuously feeds the driving voltage to drive the motor 20 in a direction toward the fully open position A. Accordingly, the motor 20 provides the drive mechanism with a motor output shown in FIG. 3 to drive the windowpane 11.

That is, from the fully closed position D to the speed control start position C, the controller 31 supplies the motor 20 with the driving voltage to provide a generally constant high motor output. Following this, when the windowpane 11 reaches the speed control start position C, the controller 31 starts control to reduce the motor output.

Additionally, although the controller 31 is configured to provide the generally constant high motor output from the fully closed position D to the speed control start position C, it may be configured to increase the motor output from a low motor output gradually to a high motor output to gently start the motor 20, after providing a high motor output over a short period of time during an initial phase of operation.

The controller 31 controls the motor 20 in such a manner that the motor output is gradually reduced from the speed control start position C to the speed control end position B. The motor output is reduced in proportion to a movement distance so that the motor output takes the value of 0 (zero) at the speed control end position B. A descending speed of the windowpane 11 becomes slower as the motor output is reduced in this manner.

The motor 20 is de-energized at the speed control end position B, and thus the motor output takes the value of 0 (zero). Even after the driving power supplied to the motor 20 is cut off, the windowpane 11 slightly moves down in the direction toward the fully open position A due to its own weight and inertia force that results from its movement. Meanwhile, drag force and sliding resistance, which are generated from the drive mechanism and the motor 20, hinder the windowpane 11 descending, thereby reducing its movement speed. Consequently, a top end of the windowpane 11 moves beyond a belt molding and stops moving down at a predetermined position before the fully open position A.

The speed control end position B is set at a position, from which the windowpane 11 cannot reach the fully open position A with its movement speed at the time the motor 20 is de-energized. That is, from the speed control start position C to the speed control end position B, the movement speed of the windowpane 11 is reduced, and then the windowpane 11 moves from the speed control end position B toward the fully open position A by means of its own weight and the inertia force that is caused by the reduced movement speed. More specifically, the speed control end position B and the movement speed of the windowpane 11 at this position are set, such that the windowpane 11 does not reach the fully open position A and stops moving down at the predetermined position before the fully open position A with its movement speed at the speed control end position B.

Besides, because the motor 20 is de-energized with its movement speed being reduced, the windowpane 11 can be stopped with hardly any deviations from a predetermined stop position. Therefore, even if the sliding resistance and the like caused by deterioration due to age vary, it can be ensured that the top end of the windowpane 11 moves down beyond the belt molding and that the windowpane 11 is stopped before the fully open position A.

In this manner, since the windowpane 11 is configured such that its top end moves down beyond the belt molding and that it stops within a narrow range before the fully open position A, an occurrence of an impulsive sound, which is made by the drive mechanism and the windowpane 11 coming into contact with a stopper and the like when the windowpane 11 is stopped, can be restricted. For this reason, an incidence of slight damage, which is cumulatively caused to the drive mechanism and the like every time the windowpane 11 is stopped, can be restricted, thereby continuously ensuring durability of the drive mechanism.

Figure 4:
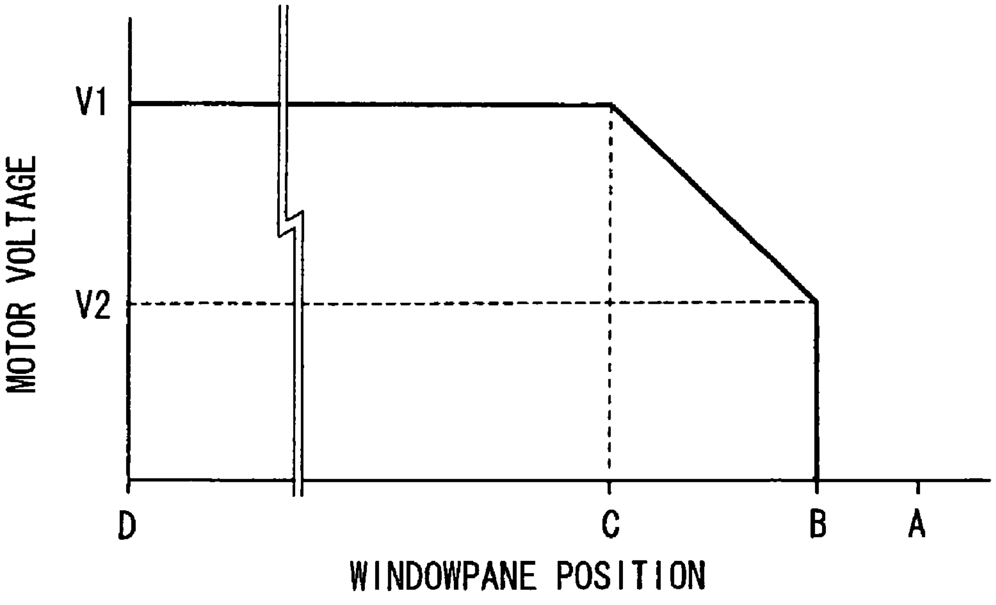
FIG. 4 is a diagram showing a relationship between a windowpane position and a motor application voltage.

Similar to FIG. 3, FIG. 4 illustrates a state where the windowpane 11 is being fully opened. Its vertical axis corresponds to a motor application voltage, and its horizontal axis corresponds to the position of the windowpane 11.

The controller 31 drives the motor 20 at a voltage (battery voltage) V1 from the fully closed position D to the speed control start position C, and controls the motor 20 to gradually reduce the drive voltage (applied voltage) from the speed control start position C to the speed control end position B. The applied voltage is reduced in proportion to the movement distance so that it is reduced to V2 at the speed control end position B.

The voltage V2 is a voltage, at which the motor 20 cannot drive the drive mechanism even if it is applied to the motor 20. Accordingly, the motor output comes to be 0 (zero) even if the voltage V2 is applied to the motor 20. Then, the motor 20 is de-energized at the speed control end position B, so that the motor application voltage is reduced to 0 (zero).

In addition, the controller 31 may be configured to apply a voltage that is equal to or lower than V2 to the motor 20 for a predetermined time to assist the windowpane 11 in descending without de-energizing the motor 20 at the speed control end position B.

As well, if the controller 31 PWM-controls the motor 20 without reducing the voltage applied to the motor 20, the duty ratio may be reduced. For example, the motor 20 may be controlled, such that the duty ratio is set at 100% from the fully closed position D to the speed control start position C, and that the duty ratio is gradually reduced from the speed control start position C to the speed control end position B.

Next, an operation of the controller 31 will be described based on FIGS. 5, 6.

Figure 5:
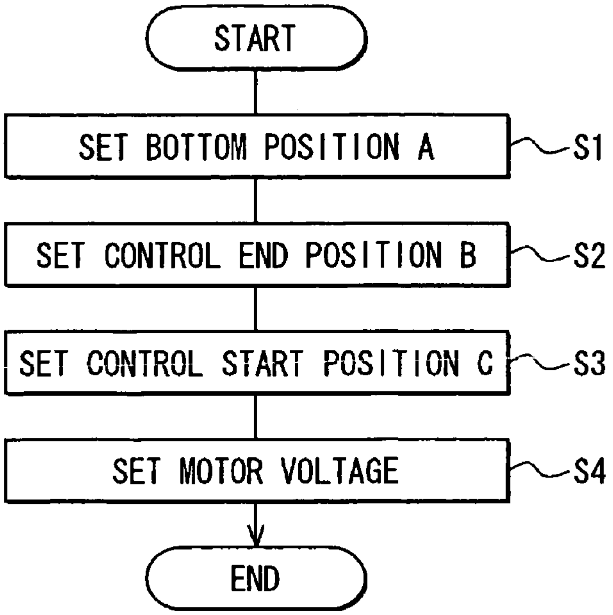
FIG. 5 is a flowchart showing setting processing of a controller.
Figure 6:
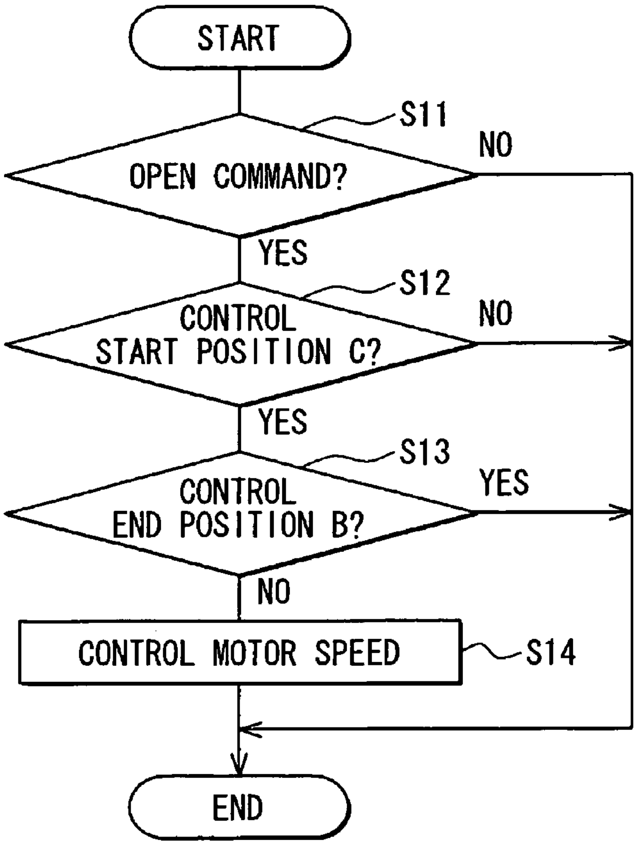
FIG. 6 is a flowchart showing an operation of a controller to fully open a windowpane.

First, in setting processing in FIG. 5, the windowpane 11 having been moved to the fully open position (bottom position) A, the number of pulse counts stored in the controller 31 is reset to zero at step S1. Subsequently, at step S2, with the fully open position A designated as the reference position, the windowpane 11 is moved up to the speed control end position B, the pulse count value at which is stored in the controller 31.

Second, at step S3, the windowpane 11 is moved up to the speed control start position C with the fully open position A being the reference position, and the pulse count value at the speed control start position C is stored in the controller 31.

After the pulse count values at the speed control end position B and the speed control start position C are set by this means, a variation in the applied voltage to the motor 20 from the speed control start position C to the speed control end position B is read into the controller 31 and is set at step S4.

In the device 1, the speed control end position B and the speed control start position C can be set by designating the fully open position A as their reference position, thereby making easier appropriate setting of a stop position of the windowpane 11 before the fully open position A regardless of vehicles or their types.

Next, based on FIG. 6, speed control processing by the controller 31 in lowering the windowpane 11 toward the fully open position A will be described. This processing is repeatedly performed at intervals of a predetermined time. The drive voltage applied to the motor 20 is regulated according to the position of the windowpane 11 in this processing.

The controller 31 monitors whether the normal or automatic opening command signal is received from the operating switch 4 so as to lower and open the windowpane 11 (step S11). If the normal or automatic opening command signal is not received from the operating switch 4 (step S11: NO), the processing is ended for the meantime, and this processing is repeated again after a predetermined time.

On the other hand, if the normal or automatic opening command signal is received from the operating switch 4 (step S11: YES), the controller 31 determines whether the present position of the windowpane 11 reaches the speed control start position C (step S12). That is, whether the present position of the windowpane 11 is located between the speed control start position C and the fully open position A is determined.

If the present position of the windowpane 11 does not reach the speed control start position C (step S12: NO), the processing is ended for the meantime. That is, in this state, the windowpane 11 is located between the fully closed position D and the speed control start position C. Since the controller 31 does not control a speed to gently stop the windowpane 11 in this interval, the applied voltage to the motor 20 is set at V1 (battery voltage). Hence, the windowpane 11 moves down with a normal movement speed.

Meanwhile, if the present position of the windowpane 11 reaches the speed control start position C (step S12: YES), the controller 31 determines whether the present position of the windowpane 11 reaches the speed control end position B (step S13). That is, whether the present position of the windowpane 11 is located between the speed control end position B and the fully open position A is determined.

If the present position of the windowpane 11 does not reach the speed control end position B (step S13: NO), the controller 31 regulates the drive voltage applied to the motor 20 according to the present position of the windowpane 11 at step S14, and then ends the processing. That is, in this state, the windowpane 11 is located between the speed control start position C and the speed control end position B, and in this interval, the controller 31 reads out the motor application voltage, which is set according to the position of the windowpane 11, to control a motor speed by applying the voltage set as shown in FIG. 4 to the motor 20.

This speed control processing (step S14) is performed until the windowpane 11 reaches the speed control end position B. As a consequence, the rotation speed of the motor 20 is reduced, thereby reducing the descending speed of the windowpane 11. The applied voltage to the motor 20 is gradually reduced so that it takes the value of V2 at the speed control end position B.

On the other hand, if the present position of the windowpane 11 reaches the speed control end position B (step S13: YES), the motor 20 is de-energized, and the processing is ended. After the de-energization of the motor 20, the windowpane 11 continues moving down toward the fully open position A by its own weight and the inertia force that results from its movement as above, and stops at the predetermined position before the fully open position A.

In this manner, between the speed control start position C and the speed control end position B, the drive voltage applied to the motor 20 is regulated to gently stop the windowpane 11 according to the position of the windowpane 11. Subsequently, from the speed control end position B adjacent to the fully open position A, the windowpane 11 makes a slight movement down toward the fully open position A by its own weight and the inertia force of its movement speed, and stops at the predetermined position.

Next, a fully opening operation of the windowpane, the speed of which is controlled by the device 1 of this case, will be compared to a comparative example, in which the speed is not controlled.

Figure 7A:
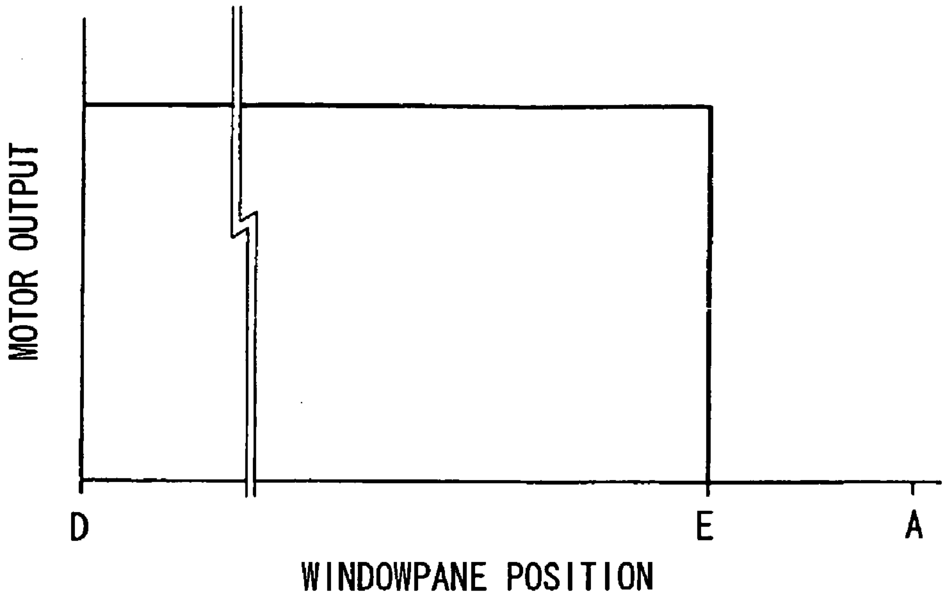
FIGS. 7A, 7B are diagrams showing relationships of a windowpane position to a motor output and to a motor rotation speed, respectively, according to a comparative example.
Figure 7B:
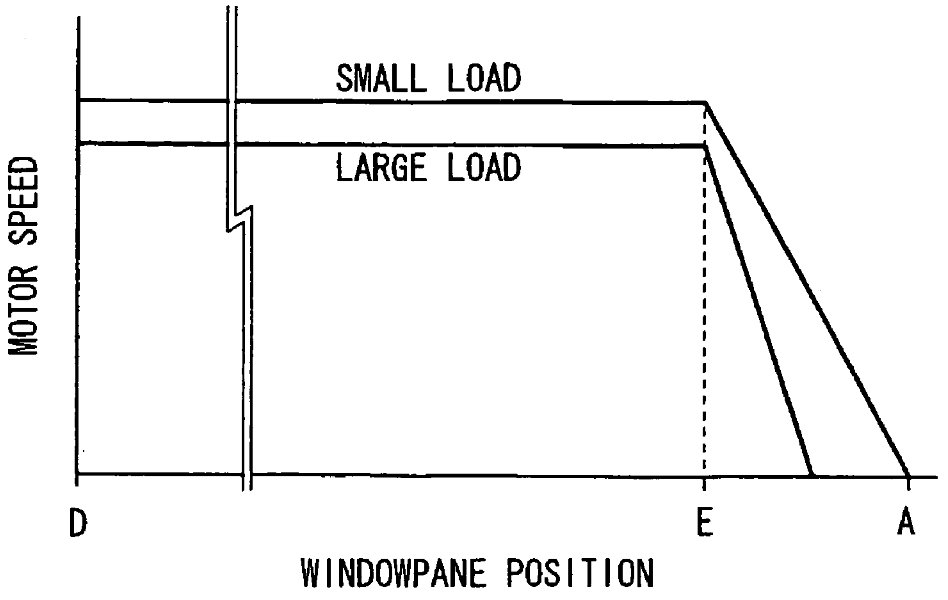

In the case where the speed control is not carried out, as shown in FIG. 7A, the motor is de-energized at an output stop position E, which is adjacent to the fully open position A, and the motor output comes to be 0 (zero). Consequently, as shown in FIG. 7B, if the sliding resistance is small (load: small), the motor rotation speed is reduced to 0 (zero) when the windowpane moves down past the output stop position E and reaches the fully open position A. That is, operations of the windowpane and the drive mechanism are forcibly stopped at the fully open position A due to their contact with the stopper and the like. Accordingly, a stopping sound is generated, and a relatively small impact is applied to the drive mechanism. If the sliding resistance is large (load: large) because of the deterioration due to age and the like, the motor rotation speed rapidly becomes small after the windowpane moves down past the output stop position E because of the large load, and comes to be 0 (zero) before the windowpane reaches the fully open position A.

As above, since the movement speed of the windowpane is high at an instant the motor is de-energized, the movement distance from the output stop position E differs significantly in proportion to a magnitude of the sliding resistance. Therefore, a variation in a stop position of the windowpane becomes considerable.

Figure 8A:
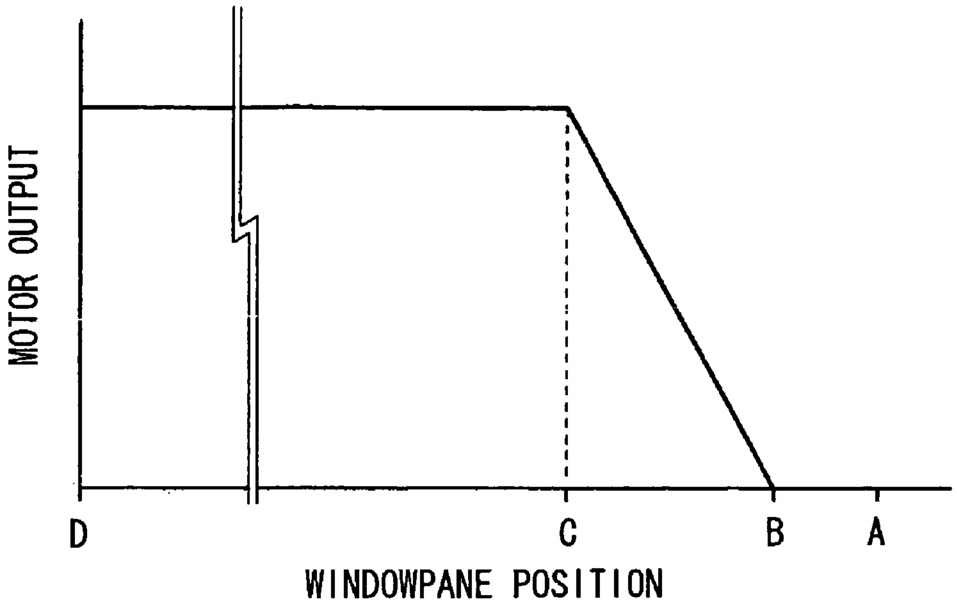
FIGS. 8A, 8B are diagrams showing relationships of a windowpane position to a motor output and to a motor rotation speed, respectively, according to the present embodiment.
Figure 8B:
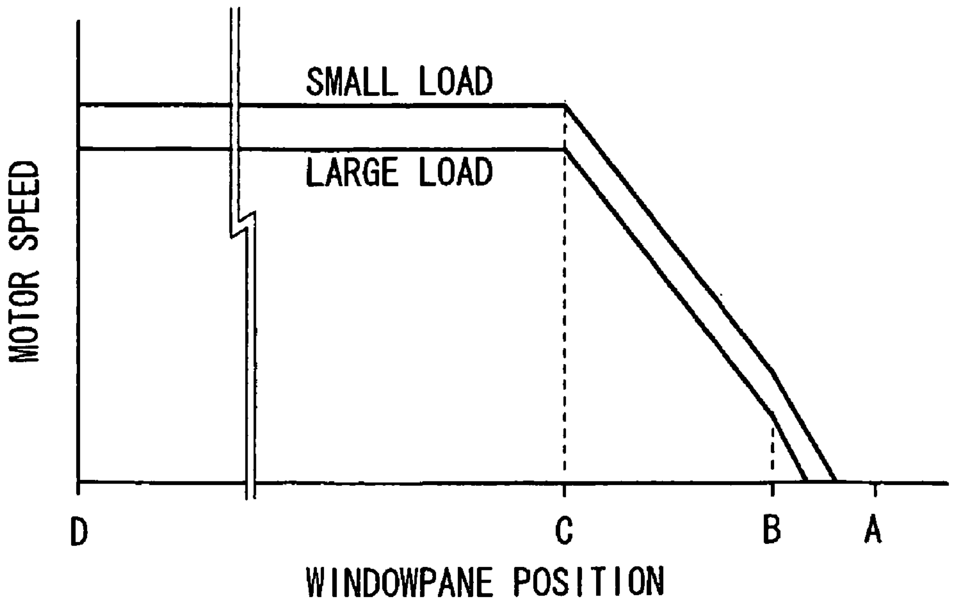

Meanwhile, in the device 1 of the present example, because the motor output is reduced from the speed control start position C to the speed control end position B as shown in FIG. 8A, the movement speed of the windowpane 11 is made slow at the speed control end position B. In consequence, the windowpane 11 moves down only by a small movement distance from the speed control end position B.

Thus, the movement distance from the speed control end position B does not differ considerably between the small sliding resistance applied to the windowpane 11 (load: small) and the great sliding resistance (load: large). Consequently, a major variation in the stop position of the windowpane 11, which depends upon the magnitude of the sliding resistance, is not caused. In this manner, in the device 1 of the present example, the variation in the stop position of the windowpane 11 due to a variation in the sliding resistance, which stems from the deterioration due to age and the like, can be reduced.

In the above embodiment, the motor output may be reduced as shown in FIGS. 9A, 9B, and FIGS. 10A, 10B, in addition to the linear reduction in the motor output in proportion to the movement speed of the windowpane 11 from the speed control start position C to the speed control end position B as shown in FIG. 3.

Figure 9A:
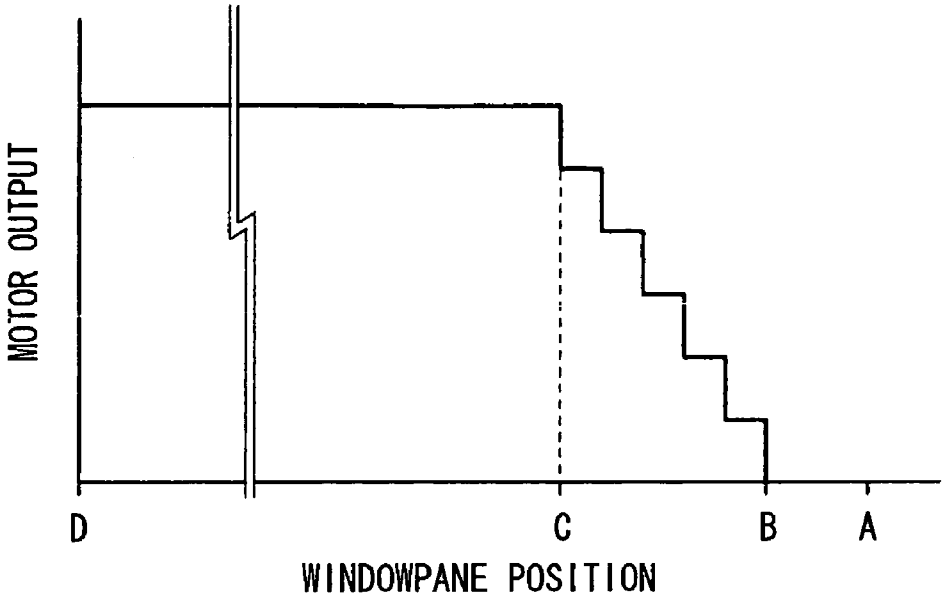
FIGS. 9A, 9B are diagrams, each of which shows a relationship between a windowpane position and a motor output according to a modification.
Figure 9B:
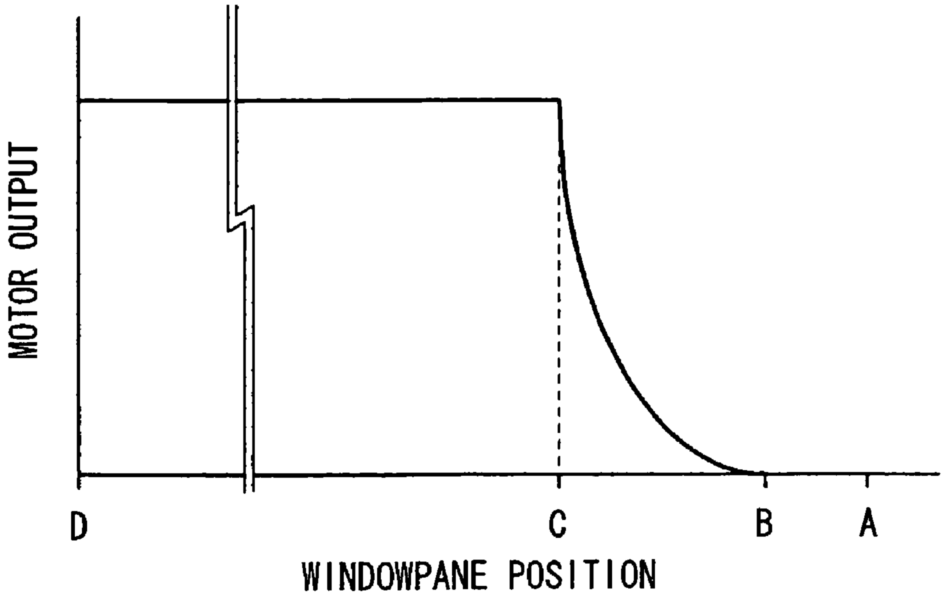

FIG. 9A shows an example, in which the motor output is reduced stepwise from the speed control start position C to the speed control end position B. In the meantime, the applied voltage to the motor 20 is reduced stepwise as well. FIG. 9B shows an example, in which the motor output is exponentially reduced from the speed control start position C to the speed control end position B. In this example, a reduction rate of the motor output is set at a larger value as the windowpane 11 is located closer to the speed control start position C than the speed control end position B.

Figure 10A:
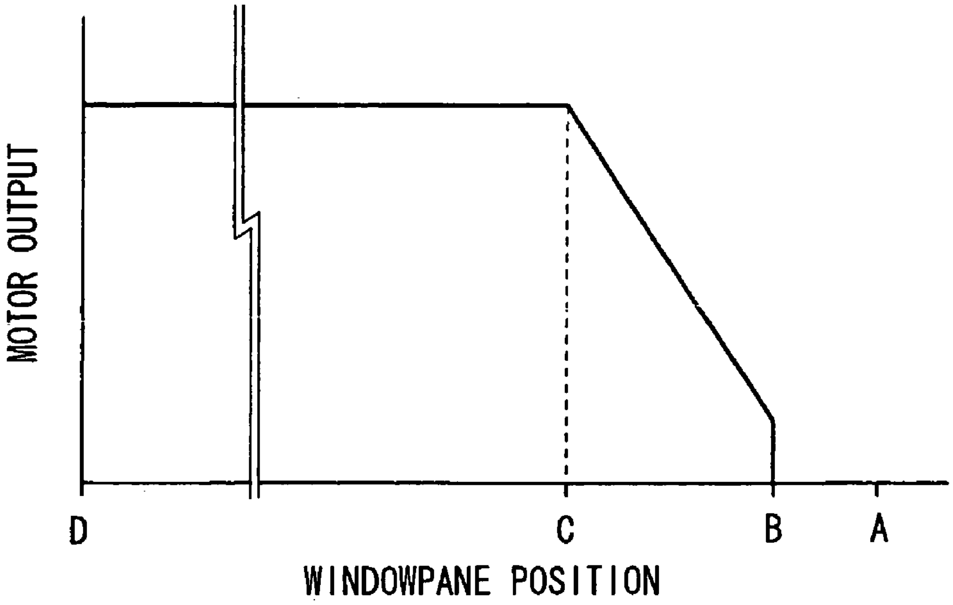
FIGS. 10A, 10B are diagrams, each of which shows a relationship between a windowpane position and a motor output according to a modification.
Figure 10B:
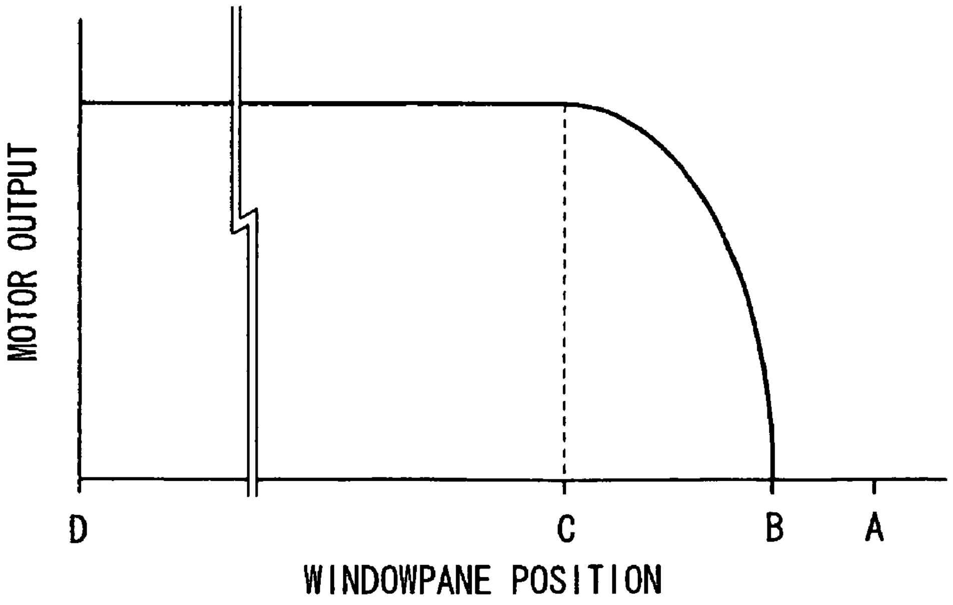

FIG. 10A shows an example, in which the motor output is linearly reduced from the speed control start position C to the speed control end position B. The motor output is reduced to have a predetermined value instead of 0 (zero) in a phase where the windowpane 11 is yet to reach the speed control end position B. Then, in a phase where the windowpane 11 has reached the speed control end position B, the motor output is controlled to be reduced to 0 (zero). Thus, in this example, the movement speed of the windowpane 11 at the speed control end position B is set at a large value. FIG. 10B shows an example, in which the motor output is reduced in a sweeping manner from the speed control start position C to the speed control end position B. In this example, the reduction rate of the motor output is set at a larger value as the windowpane 11 is located closer to the speed control end position B than the speed control start position C.

By virtue of various settings at which the motor output varies as in the above modifications, the movement speed and acceleration of the windowpane 11 at the speed control end position B can be regulated.

Besides, the above embodiments are applications of the opening/closing member control apparatus to the power window device 1 of the vehicle. Nevertheless, the opening/closing member control apparatus may be applied to an apparatus that opens or closes an opening/closing member, such as a sunroof opening/closing apparatus and a sliding door opening/closing apparatus.

What is claimed is:

1. An opening/closing member control apparatus comprising:

an opening/closing member that is movable between a fully open position and a fully closed position;

a driving means for driving the opening/closing member to be opened or closed via a drive mechanism by an operation of a motor;

a position detecting means for detecting a position of the opening/closing member; and a controlling means for controlling a drive of the motor based on the position of the opening/closing member, which is detected by the position detecting means, wherein:

the controlling means stores a first set position and a second set position, wherein:

the first set position is set between the fully open position and the fully closed position; and the second set position is set between the fully open position and the first set position, as well as adjacently to the fully open position;

the controlling means reduces a motor output after the opening/closing member reaches the first set position until the opening/closing member reaches the second set position while driving the opening/closing member in a direction toward the fully open position, and de-energizes the motor when the opening/closing member reaches the second set position; and the second set position is set at a position, from which the opening/closing member is not able to reach the fully open position with a movement speed thereof at a time when the motor is de-energized.

2. An opening/closing member control apparatus comprising:

an opening/closing member that is movable between a fully open position and a fully closed position;

a driving means for driving the opening/closing member to be opened or closed via a drive mechanism by an operation of a motor;

a position detecting means for detecting a position of the opening/closing member; and a controlling means for controlling a drive of the motor based on the position of the opening/closing member, which is detected by the position detecting means, wherein:

the controlling means stores a first set position and a second set position, wherein:

the first set position is set between the fully open position and the fully closed position; and the second set position is set between the fully open position and the first set position, as well as adjacently to the fully open position;

while driving the opening/closing member in a direction toward the fully open position, the controlling means reduces motor driving power after the opening/closing member reaches the first set position until the opening/closing member reaches the second set position, such that the motor is not able to be driven when the opening/closing member reaches the second set position; and the second set position is set at a position, from which the opening/closing member is not able to reach the fully open position with a movement speed thereof at a time when the motor driving power is reduced so that the motor is not able to be driven.

3. The opening/closing member control apparatus according to claim 1, wherein:

the controlling means stores the fully open position and the fully closed position; and the second set position is set with reference to the fully open position.

4. A method for controlling an opening/closing member in an opening/closing member control apparatus, which includes:

an opening/closing member that is movable between a fully open position and a fully closed position;

a driving means for driving the opening/closing member to be opened or closed via a drive mechanism by an operation of a motor;

a position detecting means for detecting a position of the opening/closing member; and a controlling means for controlling a drive of the motor based on the position of the opening/closing member, which is detected by the position detecting means, the method comprising:

first step of setting a first set position between the fully open position and the fully closed position, and a second set position between the fully open position and the first set position, the second set position being adjacently to the fully open position;

second step of driving the opening/closing member in a direction toward the fully open position, and of reducing a motor output after the opening/closing member reaches the first set position until the opening/closing member reaches the second set position; and third step of de-energizing the motor when the opening/closing member reaches the second set position, wherein:

the second set position is set at a position, from which the opening/closing member is not able to reach the fully open position with a movement speed thereof at a time when the motor is de-energized by the third step.

5. A method for controlling an opening/closing member in an opening/closing member control apparatus, which includes:

an opening/closing member that is movable between a fully open position and a fully closed position;

a driving means for driving the opening/closing member to be opened or closed via a drive mechanism by an operation of a motor;

a position detecting means for detecting a position of the opening/closing member; and a controlling means for controlling a drive of the motor based on the position of the opening/closing member, which is detected by the position detecting means, the method comprising:

first step of setting a first set position between the fully open position and the fully closed position, and a second set position between the fully open position and the first set position, the second set position being adjacent to the fully open position;

second step of driving the opening/closing member in a direction toward the fully open position, and of reducing motor driving power after the opening/closing member reaches the first set position until the opening/closing member reaches the second set position; and third step of reducing the motor driving power, such that the motor is not able to be driven when the opening/closing member reaches the second set position, wherein:

the second set position is set at a position, from which the opening/closing member is not able to reach the fully open position with a movement speed thereof at a time when the motor driving power is reduced by the third step so that the motor is not able to be driven.

6. The method according to claim 5, wherein the first step includes setting the second set position with reference to the fully open position.

7. A method for controlling a windowpane for an automobile, which is driven by a motor and is movable between a fully open position and a fully closed position, the method comprising:

first step of driving the motor with an approximately constant speed while the windowpane is moving in an opening direction toward a first set position, which is set between the fully open position and the fully closed position;

second step of driving the motor with a gradually decreasing speed from the constant speed while the windowpane is further moving from the first set position to a second set position, wherein:

the second set position is set between the first set position and the fully open position, as well as adjacently to the fully open position; and third step of stopping driving the motor when the windowpane reaches the second set position thereby to stop the windowpane from moving before reaching the fully open position.

8. The method according to claim 7, wherein:

voltages applied to the motor are an approximately constant voltage, a gradually decreasing voltage that is larger than zero, and zero, in the first step, the second step, and the third step, respectively.

* * * * *